April 21, 1959   J. C. FINNIGAN   2,883,123
SAFETY APPARATUS FOR USE ON A MOTOR VEHICLE
Filed Aug. 11, 1955   2 Sheets-Sheet 1
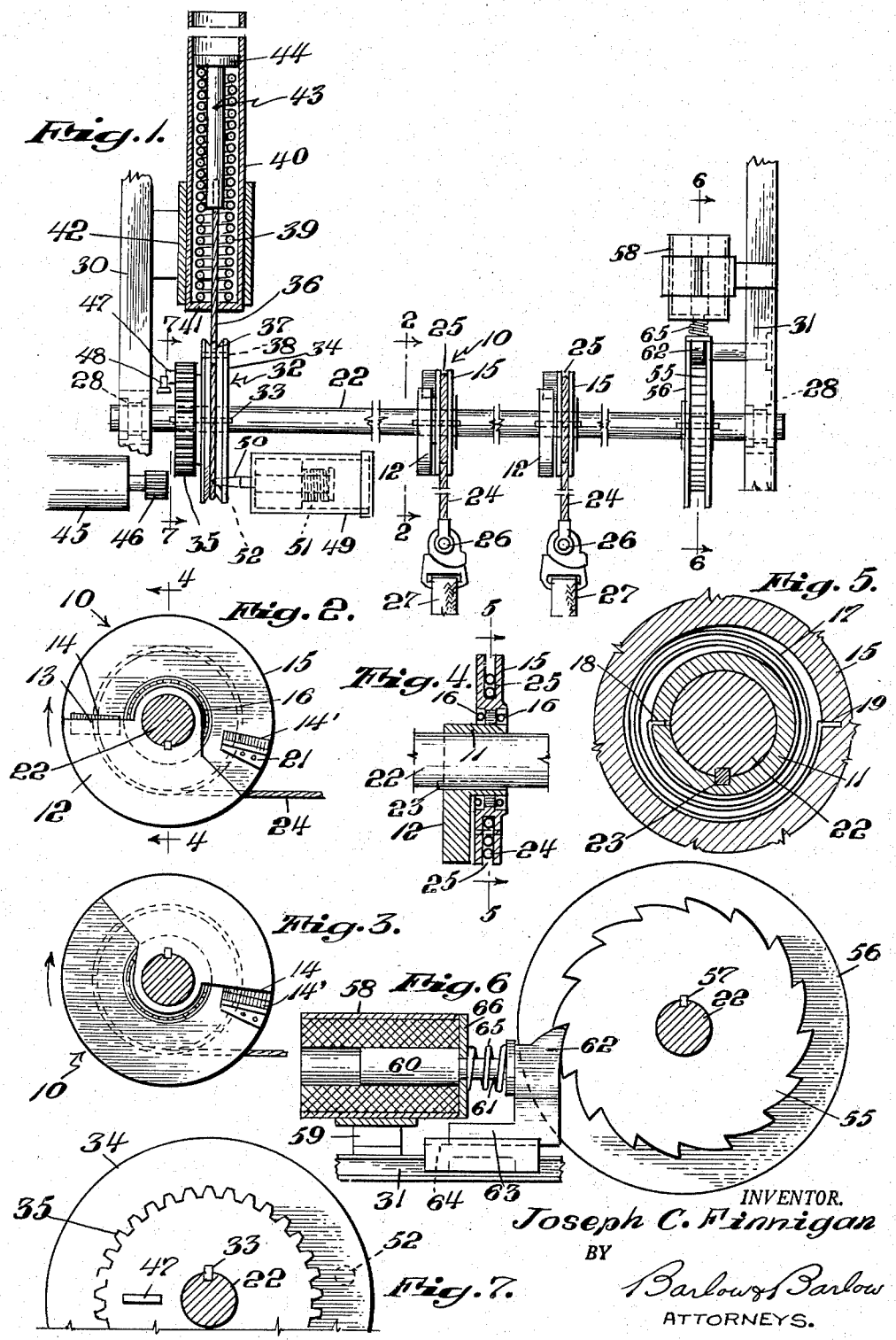
INVENTOR.
Joseph C. Finnigan
BY
Barlow & Barlow
ATTORNEYS.

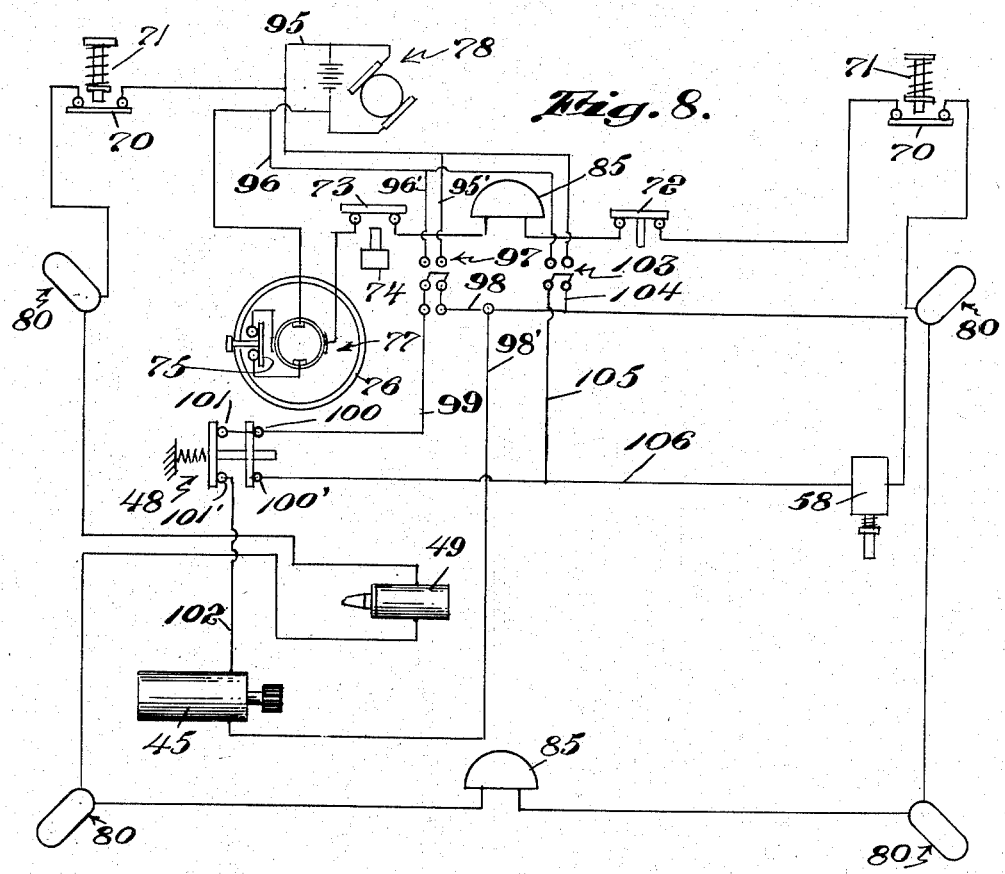

United States Patent Office 2,883,123
Patented Apr. 21, 1959.

2,883,123

SAFETY APPARATUS FOR USE ON A MOTOR VEHICLE

Joseph C. Finnigan, Middletown, R.I.

Application August 11, 1955, Serial No. 527,809

5 Claims. (Cl. 242—107.4)

This invention relates to an automatic reel or apparatus for taking up a safety strap about an occupant of a motor vehicle and electrically actuated means for controlling the operation of the reel.

An object of the invention is to provide an apparatus of the above character which may be set into operation either manually or by an abnormal traveling condition of the vehicle.

Another object of the invention is to provide an apparatus of the above character, the operation of which may be controlled by means of electrically actuated means.

A more specific object is to provide an apparatus of the above character having a plurality of safety strap take-up reels operated simultaneously from a common source of power.

Another object of the invention is to provide an apparatus of the above character wherein the power source for controlling the operation thereof will be electrically locked.

Another object of the invention is to provide an apparatus of the above character which will be controlled in its action by devices which are sensitive to any unusual swerving, skidding, bouncing, or lurching as well as to an unusual linear deceleration of the motor vehicle.

Another object of the invention is the provision of a safety belt take-up reel so constructed as to be normally operable to allow comfort to the wearer and to permit the usual shifting about from time to time of the wearer in his seat.

Another object of the invention is to provide a safety belt take-up reel so constructed as to have two parts movable in unison which also have limited movement relative to each other.

Another object of the invention is to provide a safety belt take-up reel operated through a spring wherein the initial spring force will be dampened by an inertia member so as to avoid a violent dissipation of the spring force upon release thereof.

With these and other objects in view, the invention consists of certain novel features of construction as will be more fully described and particularly pointed out in the appended claims.

In the accompanying drawings:

Figure 1 is a plan view of an apparatus embodying the invention with certain parts shown in section;

Figure 2 is a sectional view of one of the winding reels looking in the direction of the arrows on line 2—2 of Figure 1;

Figure 3 is a similar view with the parts shown in different relation;

Figure 4 is a sectional view taken on line 4—4 of Figure 2;

Figure 5 is an enlarged fragmentary sectional view taken on line 5—5 of Figure 4;

Figure 6 is an enlarged sectional view taken on line 6—6 of Figure 1;

Figure 7 is an enlarged sectional view taken on line 7—7 of Figure 1;

Figure 8 illustrates the electrical circuit of the apparatus, showing diagrammatically the various locations of the device which are actuated by certain movements to control the operation of the apparatus of Figure 1;

Figure 9 is a longitudinal sectional view of one of the devices shown in Figure 8;

Figure 10 is a sectional view taken along line 10—10 of Figure 9;

Figure 11 is a plan view of another device shown in Figure 8 with the closure therefor omitted; and Figure 12 is a sectional view taken along line 12—12 of Figure 11 with the closure in place.

The invention broadly contemplates a safety belt or harness take-up reel which is spring loaded and is automatically set into action to tighten the safety belt or harness about the occupant of the vehicle upon an erratic operation of the vehicle prior to a possible impending crash of the vehicle with an object. The take-up reel, of which there may be one for each occupant of the vehicle, is electrically controlled by means including a plurality of electrical devices which may be referred to as electrical switches and which are positioned in series with each other and at various locations on the body of the vehicle. Certain of these switches may be manually operated by the occupants of the vehicle to release the spring loading on the take-up reel. Certain of these switches may be inertia actuated and sensitive to any unusual abnormal operation of the vehicle, as by way of example, swerving, skidding, bouncing, lurching, and to unusual deceleration of the vehicle.

It may be here pointed out that the sensitivity of the inertia actuated switches is not limited in operation to the force created by the impact of the vehicle with an object but are sensitive to cause release of the spring loading on the take-up reel prior to a possible crash of the vehicle. A preferred inertia actuated switch may comprise an elongated hollow member made of insulating material and having a pair of spaced electrical contacts normally bridged by an electrical conducting sphere. One of these switches may be positioned at each corner of the vehicle body and set angularly to the normal path of travel of the vehicle or with the central axis thereof elevated at a slant to the horizontal such that any abnormal sudden side swerving of the vehicle would cause a relative movement between the sphere and contacts to open the contacts at the switch to release the spring loading on the take-up reel. The movement of the sphere of such switch is confined to move in but a single direction. Other of the inertia actuated switches may be arranged to be actuated both by an unusual deceleration of the vehicle and by an abnormal operation thereof, causing a relative movement between the sphere and the contacts in any direction within 180 degrees. One of such switches may be positioned at the front and rear of the vehicle centrally thereof.

The take-up reel is mounted on a spring loaded shaft in a manner to rotate therewith and also have limited rotation relative thereto. The shaft is held against rotation by means of a solenoid which is placed in series with the said switches which upon the opening of any one thereof will cause the solenoid to de-energize and release the shaft to be rotated by the expanding force of the spring.

In the embodiment shown, the take-up reel 10 comprises an inner cylinder 11 (see Figures 4 and 5) having a right angularly extending flange portion 12 with a leading edge 13 (see Figure 2) provided with a block 14 made of a resilient material, as by way of example rubber. A spool 15 is mounted for rotation on the cylinder 11 by means of anti-friction bearings 16. A spiral spring 17 (see Figure 5) of the so-called clock type is arranged between the bore of the spool and the cylinder 11 and has one end 18 thereof secured to the cylinder 11 and the other end 19 thereof anchored in the spool 15. Thus, the spool is spring biased tending to rotate the spool in one direction on the cylinder or core 11. The spool 15 has a projection 21 (see Figure 2) provided with a resilient block 14' which is located in the path of rotation of the block 14.

The cylinder 11 is mounted on a shaft 22 and splined thereto as at 23 for rotation therewith. A cord or cable 24 has one end thereof anchored in the groove 25 of spool 15, while the other end thereof is attached to one end portion of a safety belt or shoulder harness 27 as at 26. The safety belt or shoulder harness may be referred to as a safety element, and it will be understood that this may be of any approved type to be attached in appropriate fashion about the occupant of a vehicle and that by pulling on the end portion of belt 27 through the cord 24, the safety element will be tightened about the wearer thereof to hold the wearer to his seat. There is to be one take-up reel for each occupant of the vehicle, and each will be mounted on the shaft 22, as above described, and the cord 24 may be guided by suitable means (not shown) to be attached to the safety element or member associated therewith.

Referring to Figure 2, it will be apparent that a pull on cord 24 will rotate spool 15 in a counter-clockwise direction within the limit defined by the angular spacing between abutments 14, 14' and unwind cord from the spool 15. This counterclockwise rotation will also tension the spring 17. Upon release of the pulling force on the cord, the bias of spring 17 will rotate the spool 15 in a clockwise direction to rewind or take up the slack in the cord 24.

The shaft 22 may be journaled at an appropriate location beneath the body of the vehicle as by means of bearings 28 attached to the sides 30, 31 of the chassis of the vehicle. A winding pulley 32 is mounted on the shaft 22 at the left end portion thereof as seen in Figure 1 and is splined thereto by means of a key 33. This pulley comprises a spool 34 and a gear wheel 35 secured thereto. A cable or the like 36 is secured at one end thereof in the groove of the spool 34 in an appropriate manner, as by way of example, a loop 37 formed at the end of the cable and a pin 38 passing through the side of the pulley and through the said loop. The cable 36 is wound on the spool and extends therefrom to be connected to one end of a coil compression spring 39 as will hereinafter appear.

The spring 39 is mounted within a tubular housing 40 closed at one end by a wall 41 and secured to the chassis side 30 by means of a bracket 42. The inner end of the spring 39 engages against wall 41. A weighted member 43 has a stem received with the coils of the spring and a head 44 which abuts against the outer end of the spring. The cable 36 extends from the pulley 32 through the spring 39 and is anchored to the end of stem 43 as by being embedded therein as shown. A conventional starter motor 45 with a spur gear 46 mounted on its shaft is arranged in the shown manner to engage and rotate the gear wheel 35 and thus the pulley 32. Upon energizing of motor 45, the gear 46 will be caused to move into engagement with gear wheel 35 to rotate the same in a counter-clockwise direction as viewed from the left of Figure 1. This will wind the cable 36 on to the pulley 32 and through the weighted member 43 compress and charge the spring 39. The gear 35 has a projection 47 on the outer face thereof which engages and opens a spring loaded simple limit switch indicated at 48 (see Figure 1) to open the circuit of motor 45. This permits approximately one full turn of the pulley 32, which is sufficient to compress the spring 39 to the desired requirement. A solenoid 49 has a plunger 50 which is arranged to be moved outwardly by magnetic flux against the bias of a spring 51. The plunger 50 is adapted to engage in an opening 52 in the side of the spool 32 to lock the same against rotational movement.

A ratchet-like wheel 55 (Figure 6) having side flanges 56 is mounted on the shaft 22 at the other end portion thereof and is splined thereto as at 57 for rotation therewith. A solenoid 58 normally de-energized is mounted on the chassis side 31 by means of a bracket 59 and has a plunger 60 with a reduced stem 61 to which is secured a pawl 62 which is adapted to engage the ratchet wheel 55. The pawl 62 has a projection 63 which is guided in a guide 64 extending from the side 31. A coiled spring 65 is interposed between the pawl 62 and the adjacent end wall 66 of the solenoid and tends to move and maintain the pawl into engagement with the ratchet wheel. Upon energizing of the solenoid 58, the plunger 60 will be withdrawn to disengage the pawl 62 from the wheel 55 and free the shaft 22 for rotation thereof when rewinding the spool 32.

In the operation of the apparatus above described, the safety member 27 is properly attached and adjusted on the occupant of the vehicle. Under normal traveling condition the safety member does not restrain the occupant of the usual comfort in his seat and he may have freedom of movement within the limit permitted by the angular distance of the spacing between the blocks 14 and 14', the spring 17 taking up the slack in the safety member. Upon impending danger and opening of the electric circuit to solenoid 49, to be hereinafter described, the solenoid will be de-energized and the plunger 50 under urge of spring 51 will be withdrawn from opening 52 and permit the spring 39 to expand. The weighted member 43 which may be made of a lead material has the inertia of a body at rest initially and the same will offer some resistance to the expansion of the spring which must spend some of its energy thereon to overcome the inertia thereof. This has the net effect of preventing an immediate dissipation of kinetic energy stored in the spring and will prevent a violent initial surge by the spring. The resulting expansion of the spring 39 will rotate pulley 32 and shaft 22 in a clockwise direction as viewed from the left of Figure 1. The rotation of shaft 22 will rotate the cylinder or core 11 and move block 14 to engage block 14' and connect spool 15 to rotate as a unit with the core 11. This will wind cord 24 on to the spool 15 and take up on the safety member 27 to tighten the same about the wearer thereof so that he will be firmly held thereby to his seat. As the shaft 22 rotates, the pawl 62 rides over the ratchet wheel teeth in the known manner but prevents rotation of the shaft in the opposite direction and thus locks the shaft against rotation in the opposite direction and thus holds the safety member 27 in tightened condition upon the spring 39 having spent its energy. From the above it will be seen that there is a time lapse provided between the actual release of spring 39 and the tightening of the belt about the wearer. This time lapse is provided by the inertia in member 43 and the angular spacing between the blocks 14 and 14', this having the net effect of preventing a violent tightening action of the safety member about the wearer. After the threat of danger has passed, the solenoid 58 may be energized to withdraw the pawl 62 from engagement with the ratchet wheel 55 and thereafter the starter motor energized to rotate winding pulley 32 to return the spring to the compressed condition, the solenoid 58 being thereafter de-energized to permit pawl 62 to re-engage the ratchet wheel 55 and the apparatus to the initial loaded condition.

In Figure 8 I have shown an electric circuit and diagrammatically a plurality of switches therein which are secured in appropriate manner to the chassis and body of the vehicle at various locations thereon. A normally closed switch 70 is attached to each side of the vehicle chassis at the front end thereof at a position to be engaged and opened by the front shock absorbers 71 of the vehicle when such shock absorbers receive more than normal compression. A normally closed push button switch 72 is mounted on the vehicle body at a location within easy reach of the occupant of the vehicle and a normally closed switch 73 is positioned to be engaged and opened by the brake pedal 74 when depressed beyond normal requirement to arrest the motion of the vehicle. There is also provided a normally closed manually operated switch 75 which is positioned on the steering wheel 76 and which is connected into the electric circuit, as shown, by means of split rings in the known manner and indicated generally at 77. The switches above described are connected in series with each other and in series with the solenoid 49 to which electric energy is supplied from the power source designated generally 78 which may be the generator and battery of the vehicle. There is also mounted on the vehicle at the front and rear sides thereof an inertia actuated member which may be referred to as electric switch 80. These are angularly disposed relative to the longitudinal axis of the vehicle and tilted or slanted upward at an angle as will hereinafter appear. Each switch 80 is similar and comprises an elongated body 81 (see Figures 9 and 10) which is made of electrical insulating material and has a pair of spaced electric contacts 82 which may be of copper. A weighted sphere 83 which also may be made of copper is arranged within the body 81 and is adapted to bridge the contacts 82. The switch 80 is attached in an appropriate manner (not shown) to the vehicle and slants upwardly as indicated by the broken line 84 (Figure 10) whereby the sphere 83 will normally rest in bridging engagement with contacts 82. Upon a sudden side sway or swerving of the vehicle, the inertia in the sphere will cause it to ride off the contacts 82 to open the same. The angle of upward slant of the switches 80 will offer resistance to the movement of the sphere, and the angle may be chosen for the sphere to be responsive only to abnormal side sway or swerving of the vehicle. These switches 80 are also connected in the electric circuit in series with each other and with the previous switches described.

There is also provided at the front center and rear center of the vehicle an inertia actuated circuit breaking member 85 (see Figures 11 and 12). This member 85 may be referred to as an electric switch and differs from switch 80 in that it is responsive or sensitive to unusual deceleration of the vehicle as well as to side swerving thereof. In the embodiment shown, the switch comprises a hollow body 86 of generally semi-circular shape having a bottom wall 87, a semi-circular side wall 88, and a straight end wall 89. The bottom wall 87 slants downwardly as it progresses inwardly from the wall 88, as seen in Figure 12. The body is made of an electric insulating material and has a cover 90 made of the same material. A pair of spaced electric contacts 91, 92 are secured to the bottom wall 87 and abut against the end wall 89. The adjacent edge portions of the contacts are recessed as at 93 and form therebetween a seat for a weighted sphere to normally rest in bridging engagement with said contacts. The upper surface of the contacts are flat, as seen in Figure 12, and provide a limited flat area.

The switches 85 are also connected in the electric circuit in series with each other and the other switches previously described. Assuming an unusual deceleration of the vehicle or a side swerving thereof, the inertia of the sphere 94 will cause it to roll in the direction of movement of the vehicle and break the circuit at the contacts 91, 92. The amount of slant in wall 87 will determine the resistance to the movement of the sphere in response to the inertia thereof, and this slant may be predetermined for each different vehicle.

Electrical energy is supplied to the motor 45 from the power source 78 through wires 95, 96, branch wires 95', 96', to double pole switch 97 and from the switch 97 through wire 98, branch wire 98', to one side of the motor and through wire 99 to contacts 100, 101 of limit switch 48 and thence from contact 101' through wire 102 to the other side of motor 45. Electric energy is supplied to solenoid 58 from power source 78 through wires 95, 96 to double pole switch 103, thence through wire 104 to wire 98 to one side of the solenoid 58, and through wire 105 to wire 106 to the other side of the solenoid, wire 106 connecting with contact 100' of switch 48. The pairs of contacts 100, 100' and 101, 101' are normally closed, and the circuit to motor 45 and solenoid 58 is open at switches 97 and 103. Upon closing of switch 97, the motor 45 will be energized and the solenoid 58 likewise energized through wires 98 and 106, thus eliminating the possibility of the pawl 62 being engaged with the ratchet wheel 55 at the rewinding of pulley 32. Closing switch 103 will likewise energize solenoid 58 without effecting the motor 45 to allow freedom of movement once danger has passed and before the mechanism is reset.

The operation and function of the various electric switches has been given in connection with the detailed description thereof, and only a brief summary of the operation of the apparatus as a whole will suffice to clearly understand its mode of operation. Assuming the various parts of the apparatus properly adjusted and the vehicle traveling along in a normal manner, upon an occupant of the vehicle sensing danger, as for example a sudden stop of a vehicle ahead, the occupant may actuate switch 72, or the driver may depress the brake pedal 74 to a greater degree than normal to arrest the vehicle, which in so doing will open switch 73. In either case the circuit to solenoid 49 will be opened and the plunger 50 retracted under the urge of spring 51, and as previously described, the reel or reels 10 will operate to tighten the safety member about the occupant. Assuming prior to a possible impending crash the irratic abnormal movement of the vehicle causes any one of the several inertia actuated switches to be actuated to open the circuit at said switches, this, as previously described, will open the circuit to solenoid 49 to release the spring 39 to actuate the reels 10 to tighten the safety member about the occupant and restrain them in their seat.

In order to reset the apparatus, assume that the vehicle is at rest or in normal operating attitude. With this condition met, the solenoid 49 will be energized and the plunger 50 will be urged toward the side of spool 32. It will additionally be noted that the solenoid 58 is de-energized and the pawl 62 engages the ratchet wheel 55. When the motor 45 is energized by the closing of switch 97, the solenoid 58 will be energized thereby, withdrawing the pawl 62 to allow rotation of shaft 22 in a counter-clockwise direction as viewed in Figure 6. As soon as opening 52 in spool 34 is moved into register with pawl 50, the spool 32 will be locked against rotation against the force of the now compressed spring 39. Simultaneously with the locking of spool 32, limit switch 48 will be actuated, thereby de-energizing motor 45 and solenoid 58.

It will be seen from the above that I have disclosed an apparatus for tightening the safety member which operates prior to the impact or crash of the vehicle with an object.

I claim:

1. A safety apparatus for use on a moving motor vehicle comprising a shaft adapted to be rotatably secured on said vehicle, a take-up reel mounted on said shaft for rotation therewith, a safety member connected to said reel, a winding pulley secured to said shaft, a compression spring for rotating said shaft and engaged at one end thereof to a fixed support, flexible means connecting said pulley to said spring, and means for rotating said pulley to wind said flexible means thereon for applying a tension on said spring, an electrically operated normally energized solenoid locking said pulley against rotation and holding said spring under tension, and at least a normally closed electric switch in the electric circuit to said solenoid which is operable to move to open position de-energizing said solenoid and releasing said pulley to be rotated by the expanding force of said spring.

2. A safety apparatus for use on a moving motor vehicle comprising a shaft adapted to be rotatably secured on said vehicle, a take-up reel mounted on said shaft for rotation therewith, a safety member connected to said reel, a winding pulley secured to said shaft, a compression spring for rotating said shaft and engaged at one end thereof to a fixed support, flexible means connecting said pulley to said spring, means for rotating said pulley to wind said flexible means thereon for applying a tension on said spring, an electrically operated normally energized solenoid locking said pulley against rotation and holding said spring under tension, and an inertia operated normally closed electric switch in the electric circuit of said solenoid operable upon an abnormal traveling condition of the vehicle to move to open condition to de-energize said solenoid to release said pulley to be rotated by the expanding force of said spring.

3. A safety apparatus for use on a moving vehicle comprising a rotatable shaft, a take-up reel mounted on said shaft and connected thereto by a rotary resilient coupling, said coupling having a positive angular stop member associated therewith, a safety member associated with the occupant of the vehicle, means connecting said safety member to said reel to be taken up thereby upon rotation thereof to tighten said safety member, spring means for rotating said shaft, means for applying a tension on said spring, means for holding said spring under tension, an inertia operated means operable for releasing the means holding said spring under tension whereby the release of the energy of said spring will rotate said shaft and said reel through the stop member to take up said safety member, and means for blocking the rotation of said shaft in the opposite direction, said means comprising a ratchet wheel fixed to said shaft and a solenoid having a plunger provided with a pawl engaged with said ratchet wheel.

4. A safety apparatus as in claim 3 wherein the rotary resilient coupling is a flat helical spring.

5. A safety apparatus for use on a moving vehicle comprising a rotatable shaft, rotating means connected to said shaft, said means including a spring motor, said motor being normally restrained by a latch, a take-up reel, a safety member associated with the occupant of the vehicle, means for connecting said safety member to said reel to be taken up thereby upon rotation thereof to tighten said safety member about said occupant, said reel having a part fixed to said shaft for rotation therewith and a second part rotatable on said first part, resilient means connecting said parts to each other and yieldable under pull of said safety member on said reel, and interengaging means on said parts whereby upon release of said latch and rotation of said shaft, the safety member will first be tightened by the resilient means and then said parts will move into engagement with each other to rotate in unison with the shaft to positively tighten said safety member.

References Cited in the file of this patent

UNITED STATES PATENTS

| | | |
|---|---|---|
| 180,327 | Craine et al. | July 25, 1876 |
| 458,938 | Bloomfield | Sept. 1, 1891 |
| 877,232 | Rolland | Jan. 21, 1908 |
| 2,025,822 | Pryor | Dec. 31, 1935 |
| 2,099,359 | Woodeson et al. | Nov. 16, 1937 |
| 2,477,933 | Labser | Aug. 2, 1949 |
| 2,481,638 | Borup | Sept. 13, 1949 |
| 2,592,573 | Joncas | Apr. 15, 1952 |
| 2,708,966 | Davis | May 24, 1955 |